No. 753,295. PATENTED MAR. 1, 1904.
P. NAEF.
METHOD OF MAKING GAS.
APPLICATION FILED MAR. 14, 1899.

NO MODEL.

Witnesses:
G. F. Downing
S. G. Nottingham

Inventor:
Paul Naef
By H. A. Seymour
Attorney

No. 753,295. Patented March 1, 1904.

UNITED STATES PATENT OFFICE.

PAUL NAEF, OF NEW YORK, N. Y.

METHOD OF MAKING GAS.

SPECIFICATION forming part of Letters Patent No. 753,295, dated March 1, 1904.

Application filed March 14, 1899. Serial No. 709,101. (No specimens.)

*To all whom it may concern:*

Be it known that I, PAUL NAEF, Ph. D., a citizen of Switzerland, and a resident of 132 Woody Crest avenue, New York city, in the county of New York and State of New York, have invented a certain new and useful Method of Making Gas, of which the following is a specification.

This invention relates to an improved method of making gas for illuminating and heating purposes; and it consists in certain novel steps, as hereinafter set forth, and pointed out in the claims.

The application of this method consists in this case in supplying part or all the heat required by the reaction $C + H_2O = CO + H_2$ and, if desired, also for the distillation of the volatile matter of the fuel by heating the steam to a high temperature in the heater and acting with the same on the carbon of the fuel until the temperature is so reduced that the reaction ceases, reheating the mixture of water-gas and steam thus produced in a heater and acting with the same again on the carbon, and repeating the reheating of the gaseous reaction products and the action of the same on the carbon as often as required. After each reheating an additional amount of steam is decomposed, and it is thus possible to produce water-gas continuously and with a small excess of steam. At the same time a large amount of the nitrogen contained in the fuel is converted into ammonia, which can be recovered by passing the gases through a suitable washing plant.

In most cases it will be desirable to use more than two furnaces or to arrange the plant so that the reaction products can be heated repeatedly. If bituminous fuel is used, it will in most cases be of advantage to use the furnace on the highest level for the distillation of the volatile matter of the coal. It is of advantage to discharge a mixture of unburned coal and cinders from the lowest furnace, which can be discharged into a gas-producer on a lower level, where it is used for the production of producer-gas for heating the gas-heating stoves. This way of working prevents clinkering of the cinders and insures that only material is present in the revolving furnace containing sufficient carbon for the decomposition of the steam.

The process can also be carried out in a number of gas-generators, which are advantageously placed one above the other. The fuel passes successively through the generators downward. The gaseous products pass also successively through one generator after the other and are heated before they enter each generator.

Figure 1:
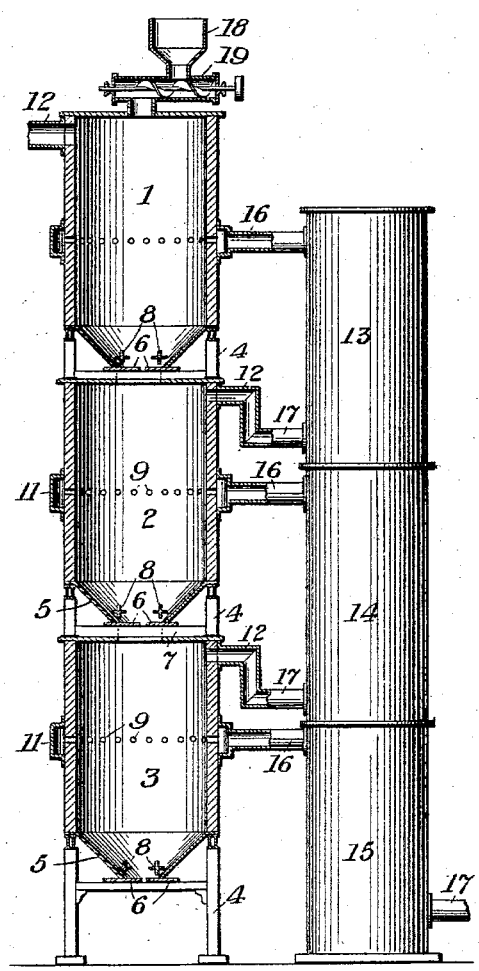
Figure 2:
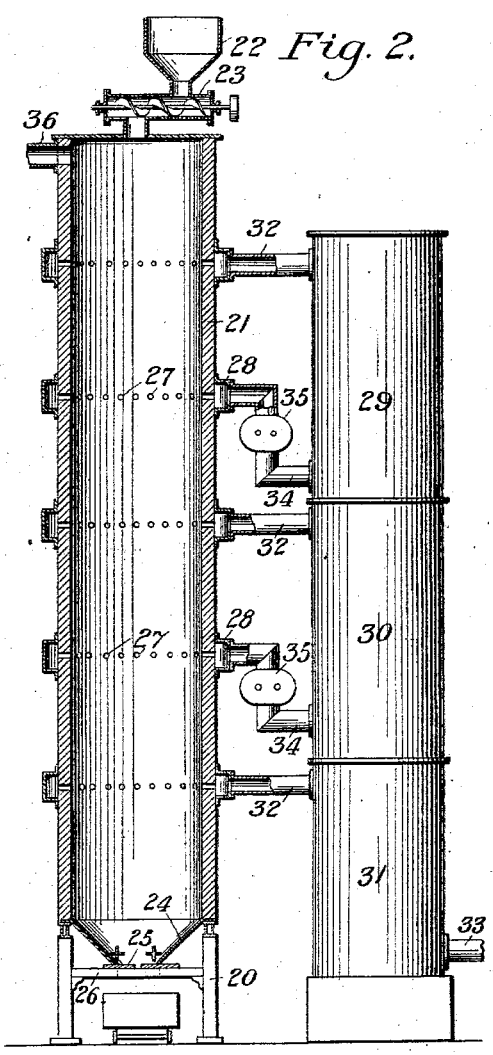

In the drawings, Figure 1 shows the arrangement of such a plant of superposed generators. Fig. 2 shows one high generator, from which gas is withdrawn heated in heaters and reinjected into the generator several times.

In Fig. 1, 1, 2, and 3 are the generators, which are incased by iron mantles and supported by the columns 4. The generators have conical bottoms 5, fitted with sliding doors 6, the latter being supported by horizontal beams 7. In the conical part there is preferably arranged a suitable mechanical arrangement for discharging continuously the material from one generator to the other. In the drawings toothed revolving rollers 8 are shown for this purpose. Inside the generators are lined with fire-brick. Some distance above the cone each generator has radial ducts 9, connecting the interior with an annular channel 11. Near the top each generator has a gas-outlet pipe 12. 13 14 15 are the gas-heaters, which are here only shown in outline. They may be of any suitable construction and may be continuous or discontinuous, as the heaters usually used at iron blast-furnaces. Each heater is shown with an outlet for the hot gas, 16, which is connected with the annular channels of the generators, and an inlet 17, which, with the exception of the lowest heater, is connected with the outlet on the top of the generators. Generator 1 has a suitable fuel-feed consisting of hopper 18 and conveyer 19.

Before describing the operation of the apparatus shown in Fig. 1 I will give a description of Fig. 2. Instead of separate generators there is here shown one generator of considerable height. It is supported on columns 20, is incased by an iron mantle, and is lined with fire-bricks 21. On the top it is closed and has a suitable fuel-feed. In this case is shown a hopper 22 and a conveyer 23, feeding fuel from it into the generator. At the bottom of the generator is shown a cone 24, which is closed with sliding doors 25, resting on a horizontal beam 26. The generator is fitted with a number of series of ducts 27, which are in connection with annular channels 28. 29 30 31 represent the gas-heaters. Each heater has an outlet for the heated gas, 32, which is connected to one of the annular channels. The lowest heater has an inlet 33 for steam or for a mixture of steam and gas. If a mixture is used, pipe 33 is connected with a suitable gas-pump. The upper heaters have each a gas-inlet 34, which is in connection with some of the annular channels 28. For the purpose of withdrawing gas from the generator and circulating it through the heater there are arranged fans 35 or other suitable means for creating a draft. If fans are used, suitable arrangements have to be made for cooling the working parts. The heaters are only shown in outline and may be of any suitable construction. On the top the generator has an outlet-pipe 36 for conducting the gas to a suitable washing plant. (Not shown.)

The operation of the apparatus shown in Fig. 1 is as follows: Fuel is fed from hopper 18 by means of the conveyer 19 into the generator. For the purpose of starting the plant the fuel in the generators is heated to a high temperature, which can be more conveniently done by injecting air into the annular channel of the lowest generators. By keeping the sliding doors open the hot gas will rise through the upper generators and escape from generator 1 by means of pipe 12. After the fuel is sufficiently hot the continuous production of water-gas can begin. Steam is injected into the lowest heater and enters the generator through the ducts in a highly-heated state. As the gas passes through the fuel steam is decomposed and a mixture of the same with steam leaves the generator 3 and enters into the second heater 14. It is here again heated as high as possible and enters the generator 2. In passing through the same a further amount of steam is decomposed, and the gas is cooled at the same time. It leaves generator 2 and enters heater 13, where it is again heated as high as possible. From the heater it passes through generator 1, where a further amount of steam is used. If bituminous fuel is used, the volatile matter is gasified in the generator. The sliding doors 6 can be opened at intervals for transferring the fuel from one generator to the other. If mechanical means are used for continuous discharge, the doors are kept only partly open, so as to force all the gas through the heaters. For the purpose of assisting the discharge suitable poke-holes are arranged. The doors 6 are preferably cooled with water. The water-gas, which leaves the apparatus through pipes 12, is conducted through suitable washing apparatus (not shown) for recovery of ammonia. It contains practically no nitrogen.

The operation of the apparatus shown in Fig. 2 is very much the same as that of Fig. 1. Fuel is continuously fed from hopper 22 by means of conveyer 23 into the generator, and the cinders are withdrawn through the conical bottom 24 and the doors 25. Steam is passed into heaters 31 through pipe 33 and enters the generator through pipe 32 in a highly-heated state. During its passage through the fuel part of the steam is decomposed. The gas is withdrawn from the generator through the ducts 27 and passed through heater 30, where the gas is again highly heated. It reënters the generator through pipe 32 and the next higher series of ducts 27, and in passing through the fuel a further amount of steam is decomposed. The gas is again withdrawn through pipe 34, passes through heater 29, and reënters the generator through pipe 32. There is a further amount of steam decomposed, and if bituminous fuel is charged into the apparatus the volatile matter is gasified. The gas, which leaves the apparatus at 36, is conducted through suitable washing plants for the recovery of ammonia.

The process is entirely automatic and continuous, fuel and steam being supplied to it and water-gas being delivered continuously.

In most cases it will be of advantage to consume the combustible matter only partly in the water-gas apparatus. The material withdrawn from it can be gasified in a gas-producer preferably located below the water-gas generator. The producer-gas is used for heating the gas-heaters. In this way there is always a material present in the water-gas generator containing a large amount of combustible matter.

To avoid risk of destruction of ammonia during the heating of the gas, the gas can after each passage through the fuel be treated for the recovery of ammonia. In this case the generators are arranged side by side, and the gas from each generator is treated for recovery of ammonia. If bituminous fuel is used in each generator, the temperature of the gas leaving it will not be very high. For the purpose of preventing loss of heat the gas can be conducted through a chamber through which pass a number of iron pipes. Through the latter is conducted the air which is used for burning the producer-gas in the heaters. The same construction of a cooler can be used if the gas is only treated for recovery of ammonia after it has passed the last time through the fuel.

The process can be considerably hastened by passing so much steam through the apparatus that the gas which leaves after the last heating and conducting through the fuel contains a considerable excess of steam. By means of a pipe and a suitable blower (not shown in the drawings) part of this gas is returned to the lowest heater after adding steam to it and only the surplus is withdrawn. This mode of working has the advantage that as the specific heat of steam is much higher than that of the combustible gas more heat is taken up by the gaseous mixture during its passage through the heater and more water-gas is formed. It is generally applicable to the manufacture of water-gas and is further treated in another application of even date.

For the purpose of further hastening the formation of water-gas I heat the fuel before the mixture of steam and gas is passed through it. This can be conveniently done by injecting air for a period into the fuel, as is done in the present water-gas processes. The fuel-gas thus obtained is with advantage used for the purpose of heating the heaters. Compared with the ordinary water-gas process a great economy can be effected by using several generators, heating them periodically up by blowing air through them, afterward conducting steam through one of the generators, and conducting the gas products successively through the other generators without heating the gas as it passes from one generator to the other. As in this case a heated mixture of steam and gas enters the second and later generators a great economy of fuel is obtained, and the generators will do much more work than if they would be working singly. Much longer water-gas runs will be possible and more water-gas will be produced per ton of fuel. The economy and efficiency will still further be increased by using the heaters for heating the gaseous product as it passes from one generator to the other and for heating the steam entering the first generator. By blowing the last generator oftener with air a large excess of steam can be maintained in the first generators, whereby the reaction is hastened and at the same time a comparatively dry gas will be obtained from the last generator. The same arrangement is of advantage if used in connection with the apparatus shown in the drawings. By passing the gas from the large apparatus there shown through a generator which is alternately heated by blowing air through it a dry gas will be obtained, although a gas containing a considerable amount of steam is circulating in the large apparatus.

Instead of mixing the gas and steam before heating the gas and the steam can be heated separately. The mode of heating is not limited to the use of the heaters. Any suitable method of heating gaseous fluid can be adopted. The gas can, for instance, be heated by conducting it through fuel which has previously been heated with air.

The process can with advantage be used in combination with my coking system, the coke being used in the water-gas process.

If by-products are only recovered during the coking, a much smaller by-product plant will be required than if all the water-gas is treated for by-products.

The apparatus may be made of any sections and varied to effect the best results under certain conditions without departing from the spirit of the invention.

I do not in this case claim the features of construction of the apparatus, as the same is reserved to constitute the subject of a separate application.

Having fully described my invention, what I claim as new, and desire to secure by Letters Patent, is—

1. The method of producing water-gas and by-products from bituminous fuel, which consists in injecting steam into a portion of a moving body of fuel, withdrawing the reaction products, reheating them and passing them through another portion of said moving body of fuel.

2. The method of producing water-gas and by-products, which consists in passing carbonaceous fuel successively through a number of superimposed communicating furnace-chambers, passing heated steam through the lower furnace-chamber and successively upward through the upper furnace-chambers and heating the gaseous reaction products as they pass from one furnace-chamber to another.

3. The method, which consists in withdrawing gaseous fluids at several points between the ends of a body of fuel and reintroducing said fluids to the body of fuel at points near those from which said fluids were withdrawn.

Signed at New York, in the county of New York and State of New York, this 13th day of March, A. D. 1899.

PAUL NAEF.

Witnesses:
W. E. BROWER,
SAMUEL W. ROMAIN.